(12) United States Patent
Chilton

(10) Patent No.: US 6,684,522 B2
(45) Date of Patent: Feb. 3, 2004

(54) DEVICE FOR MEASURING WOOD BLOCKS AND METHOD

(76) Inventor: Sean K. Chilton, 1158 Meta St., Ventura, CA (US) 93001

( * ) Notice: Subject to any disclaimer, the term of this patent is extended or adjusted under 35 U.S.C. 154(b) by 17 days.

(21) Appl. No.: 09/970,902

(22) Filed: Oct. 5, 2001

(65) Prior Publication Data

US 2003/0066203 A1 Apr. 10, 2003

(51) Int. Cl.[7] ................................................. G01B 3/00
(52) U.S. Cl. ........................... 33/759; 33/797; 33/494; 33/755; 33/483
(58) Field of Search .................. 33/492, 494, 755, 33/483, 759, 760, 679.1

(56) References Cited

U.S. PATENT DOCUMENTS

| 190,447 | A | * | 5/1877 | Putnam ........................ 33/494 |
| 2,187,087 | A | * | 1/1940 | Leary ........................... 33/137 |
| 4,149,320 | A | * | 4/1979 | Troyer et al. ................. 33/758 |
| 4,301,596 | A | * | 11/1981 | Sedlock ........................ 33/494 |
| 4,649,649 | A | * | 3/1987 | Fain ............................. 33/138 |
| 5,012,590 | A | * | 5/1991 | Wagner et al. ................ 33/494 |
| 5,632,095 | A | * | 5/1997 | Day ............................. 33/483 |
| 5,884,411 | A | * | 3/1999 | Raber .......................... 33/613 |
| 6,219,976 | B1 | * | 4/2001 | Bond ........................... 33/494 |

\* cited by examiner

*Primary Examiner*—Diego Gutierrez
*Assistant Examiner*—Amanda J. Hoolahan
(74) *Attorney, Agent, or Firm*—Timothy Thut Tyson; Ted Masters

(57) ABSTRACT

A special tape (22) for measuring blocks used in the construction of wood structures includes two special scales. A first scale has marks (32) spaced at 14½ inch intervals for making blocks for studs, and a second scale has marks (34) spaced at 22½ inch intervals for making blocks for rafters. The tape (22) is longitudinally placed along a two-by board (500) and marks (36) made on the two-by board (500) at the desired intervals of 14½ or 22½ inches. The two-by board (500) is then cut at the marks (36) to create the blocks, which are then placed between the studs or rafters.

1 Claim, 3 Drawing Sheets

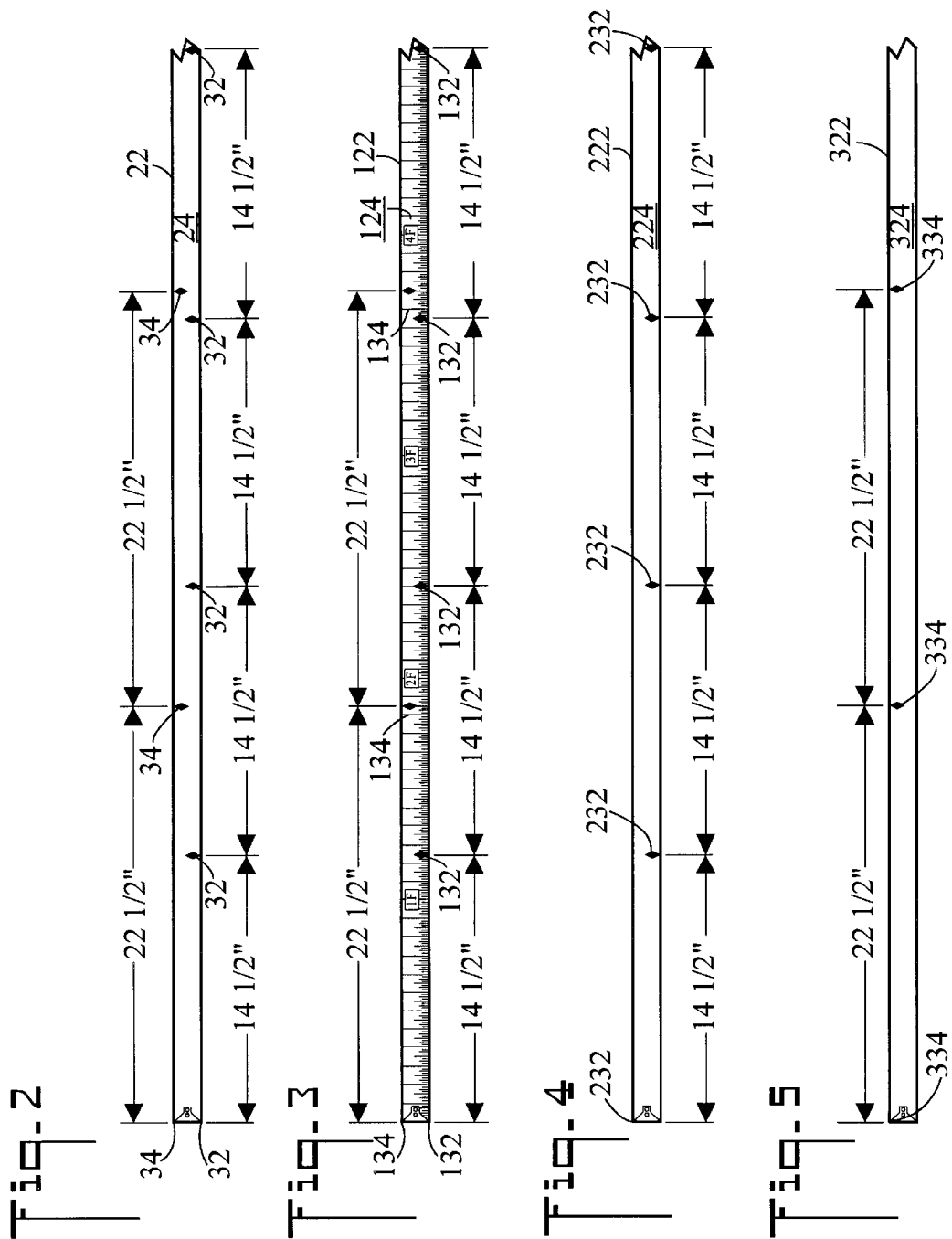

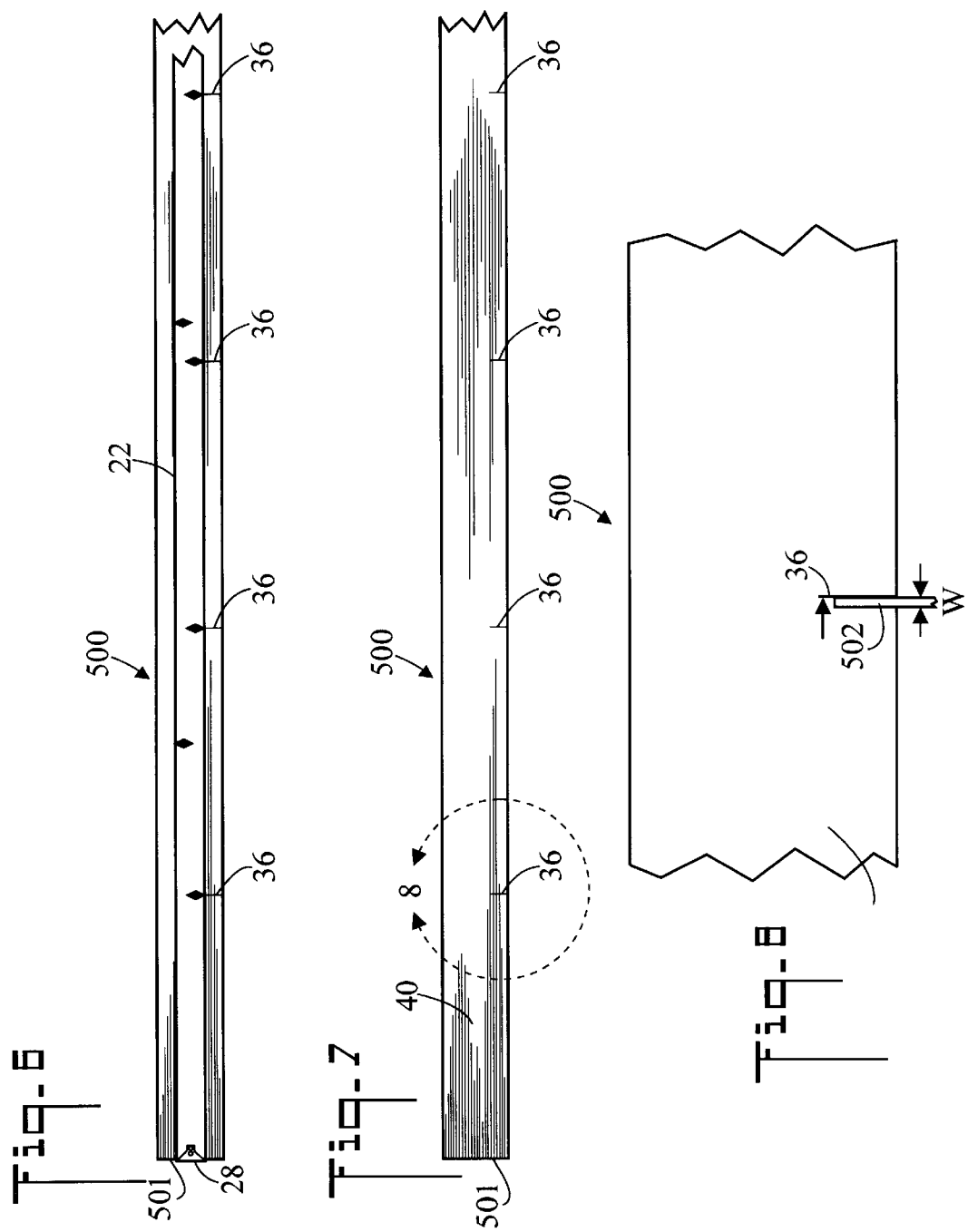

DEVICE FOR MEASURING WOOD BLOCKS AND METHOD

TECHNICAL FIELD

The present invention pertains generally to construction of wood buildings, and more particularly to a tape that may be used to accurately measure the structural blocks that are placed between adjacent wall studs, roof rafters, ceiling joists, and floor joists.

BACKGROUND ART

Wood buildings are built by assembling individual studs, headers, rafters, etc. into walls, ceilings, floors, and roofs. All dimensions are set by the UBC (Uniform Building Code). Most floors, roofs, ceilings, and walls are built using two-by (2x) dimensional framing lumber. For example, 2 by 4 lumber may be used in walls, 2 by 12 lumber may be used in floors, and 2 by 8 lumber may be used in roofs. The UBC requires that these wall stud, floor joist, and roof rafter framing members be placed on 16 inch centers. This means that the centers of the boards must be 16 inches apart. Other centers are sometimes specified. For example, the UBC requires that truss roof framing members be placed on 24 inch centers.

Conventional tape measures typically contain marks at 16 inch intervals to assist in the placement of the framing members. The framing lumber is actually about 1½ inches wide meaning that ¾ inch of wood is on each side of the center line. This means that there will be about 14½ inches of free space between the sides of adjacent framing members. Structural blocks are placed in this space to give integrity to the structure. An example of this is the placement of a block between two adjacent floor joists. The block keeps the joists in upright positions and keeps them from twisting on their nails. Blocks are also used in other ways such as for fire blocks, Freis blocks, pressure blocks, mid-span blocks, and diaphragm blocks.

The framing lumber is, however, typically wider than 1½ inches due to the original cut, being bowed, or being swollen due to moisture. Also, exact placement of the centers of adjacent members at the specified distance is rarely perfect. Therefore, in practicality the actual distance between adjacent members will be less than 14½ inches. Some tolerance in the lengths of the blocks is therefore desirable to allow them to fit into place between the framing members easily. The width of a standard 7¼ inch saw blade, which is about 3/32 inches, can be used to create such a tolerance in the lengths of the blocks. A 2x board is marked and cut at 14½ inch intervals creating blocks that are slightly less that 14½ inches long due to the width of the saw blade. Similarly, by measuring and cutting blocks at 22½ inches, blocks are created which will fit between truss roof rafters that are routinely set on 24 inch centers.

The preferred method of making a block is to use a special saw fixture that has a table and a stop which is set to produce a 14 13/32 inch long block. A long board is fed into the table until it abuts the stop. A block is then cut. This feeding and cutting process is repeated until the desired number of blocks have been produced.

However, the special saw fixture is often not available at a job site. The carpenter must then make the 14 13/32 inch blocks by measuring and cutting them using hand tools including a tape measure, pencil, and square and power tools including a circular saw and blade. To do so, the carpenter measures a 14½ inch interval on a long board and makes a block. The problem with this method of making one block at a time is that it is very tedious and time consuming. Or, the carpenter makes a pattern using one 14 13/32 inch block and progressively marks a long board allowing for the width of the blade. The problem with the second method is inaccuracy. Each time the carpenter moves the pattern block down the length of the board, there is opportunity for measurement error. As a result, the second method typically produces blocks of inaccurate lengths that do not properly fit between the framing members.

Measuring tapes and framing tools are well known in the art. For example, U.S. Pat. No. 4,149,320 shows a measuring tape for manual measurement in the building construction industry. The measuring tape comprises a pressure-sensitive adhesive tape that may be placed upon a structural member as a template.

U.S. Pat. No. 4,367,590 illustrates a calibrated tape for use in constructing walls with vertical studs. The calibrated tape is capable of being separated into halves along a central portion thereof. The tape has indicia thereon which represent units of distance: each half of the tape has the same indicia as the other half The tape is secured to a pair of adjacent plates which are then used to form the upper and lower plates of a wall of the type having spaced, vertical studs secured to the plates.

U.S. Pat. No. 4,499,666 shows a framing layout tool which facilitates the accurate and quick layout of framing marking for a structure. A bi-directional measuring scale provides a means for measuring and marking the location of any size door or window opening.

U.S. Pat. No. 5,012,590 discloses a layout tape for use in positioning building materials, such as studs, joists, and rafters, in a building. The tape is left in place in the building upon completion. The layout tape preferably has an adhesive backing for mounting the tape at the point of use. Indicia on the tape indicate to a user the direction of layout, centers in desired multiples of unit lengths, and right/left material mounting positions in relation to such centers.

U.S. Pat. No. 5,129,153 comprises a structural member spacing tool for positioning adjacent structural members at a predetermined distance apart. During assembly, parallel, spaced apart support surfaces provide rigid support within a stud cavity between adjacent stud members.

U.S. Pat. No. 5,251,382 shows a measuring tape for quick determination of the center of a distance without requiring the calculation of the distance. The measuring tape includes two parallel edges and an ascending measuring scale along each edge printed on the same face of the tape and beginning at the same end of the tape. One of the scales has units calibrated to a conventional unit of length measurement. The second measuring scale has units calibrated to be exactly half the unit of the first scale.

U.S. Pat. No. 5,396,710 describes a generally U-shaped carpentry building tool which includes a reference plate member for placement on one or more building members. A first marking guide arm is connected at 90 degrees to one end of the reference plate member. A second marking guide arm is connected at 90 degrees to the other end of the reference plate member to form a generally U-shaped tool.

U.S. Pat. No. 5,913,586 depicts a tape measure on which the indicia allows the measurements to be read from either side. A centering strip is provided which gives fractional values corresponding to the primary indicia, thus allowing easy calculation of certain fractions of a given measurement.

DISCLOSURE OF INVENTION

The present invention is directed to a device for measuring wood blocks for use in the construction industry. The device may be utilized at a job site to measure and cut blocks more accurately than is possible using existing methods. The device comprises a tape measure which has marks at both 14½ and 22½ inch intervals. The device is placed on a long two-by board, registered against an end of the board, and then used to make marks on the board at the desired intervals. The board is then cut with a saw to create the blocks. The present invention allows the blocks to be made rapidly and, more importantly, avoids measurement errors.

In accordance with a preferred embodiment of the invention, a first set of spaced marks are longitudinally disposed on the surface of the tape at 14½ inches apart. A second set of spaced marks are also longitudinally disposed on the surface of the tape at 22½ inches apart.

In accordance with a preferred embodiment of the invention, the first and second sets of marks are the only marks disposed on the surface of the tape.

In accordance with another possible embodiment of the invention, conventional tape measure markings are also disposed on the surface of the tape.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 2 is a reduced fragmented top plan view of a tape in accordance with the present invention;

FIG. 3 is a reduced fragmented top plan view of a second embodiment of the tape;

FIG. 4 is a reduced fragmented top plan view of a third embodiment of the tape;

FIG. 5 is a reduced fragmented top plan view of a fourth embodiment of the tape;

FIG. 6 is a reduced fragmented top plan view of the tape placed upon a board, and marks made at 14½ inch intervals;

FIG. 7 is a reduced fragmented top plan view of the board and the marks; and,

FIG. 8 is an enlarged view of area 8 of FIG. 7 showing a saw blade registered against the first mark.

MODES FOR CARRYING OUT THE INVENTION

Figure 1:
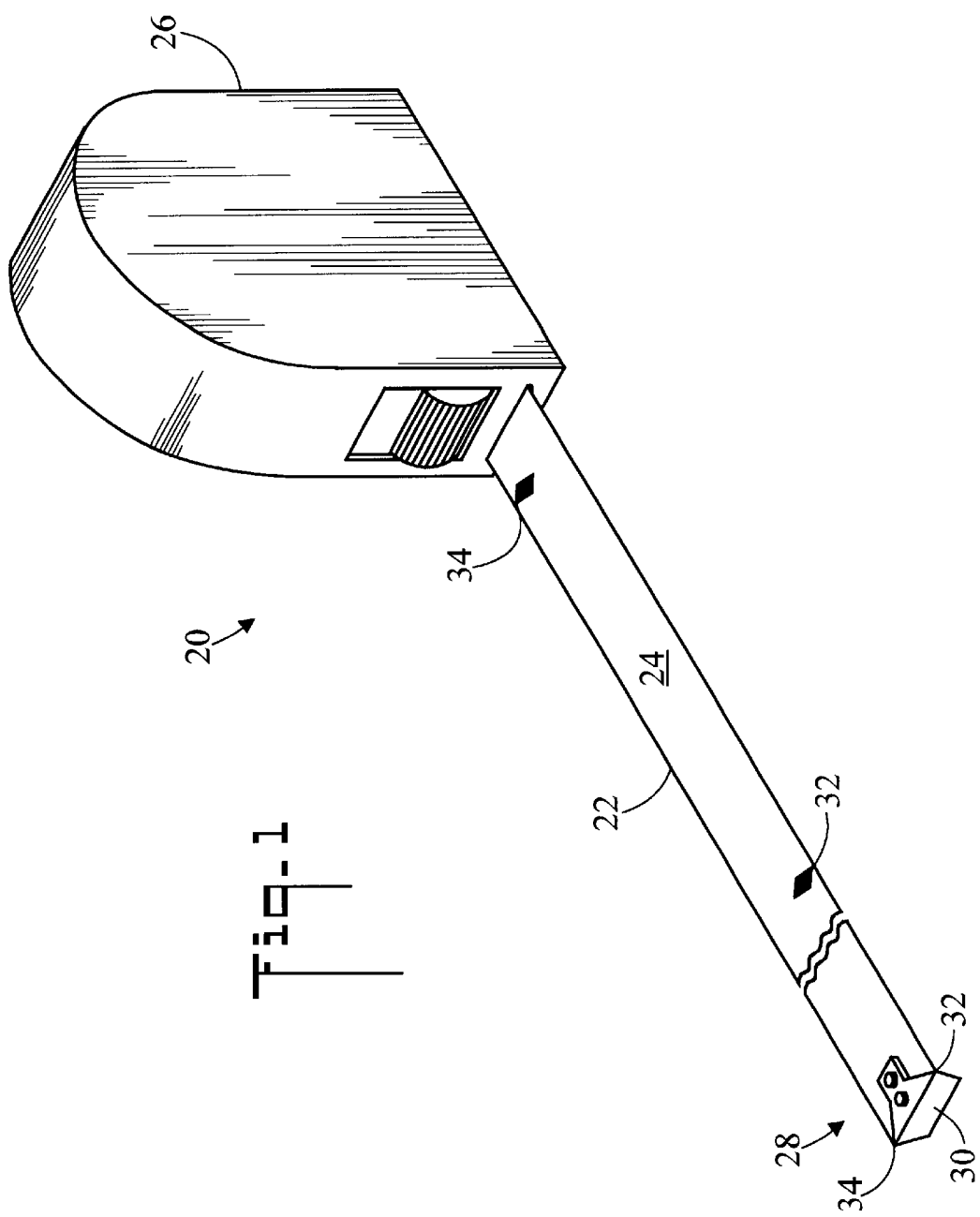
FIG. 1 is a perspective view of a device for measuring wood blocks in accordance with the present invention.

Referring initially to FIG. 1, a perspective view is illustrated of a device for measuring wood blocks in accordance with the present invention, generally designated as 20. Device 20 includes a tape 22 which has a surface 24. In the shown preferred embodiment, tape 22 is disposed within a conventional tape measure housing 26, so that tape 22 is urged into a coiled configuration within housing 26. Additionally, tape 22 includes a free end 28 which has a conventional "true-zero hook" 30, sometimes called a hook end.

FIG. 2 is a reduced fragmented top plan view of tape 22. Tape 22 includes a first plurality of spaced stations 32 longitudinally disposed on surface 24. First plurality of spaced stations 32 are spaced 14½ inches apart. Tape 22 also includes a second plurality of spaced stations 34 longitudinally disposed on surface 24. Second plurality of spaced stations 34 are spaced 22½ inches apart. It is noted that true-zero hook 30 comprises both a first 32 and second 34 spaced station. It is also noted that in the shown embodiment, first plurality of spaced stations 32 and second plurality of spaced stations 34 are the only spaced stations disposed on surface 24 of tape 22. This results in the least possible confusion to a user. It is also noted that spaced stations 32 and 34 are disposed near the edge of tape 22. It may be appreciated that while the preferred interval between adjacent first spaced stations 32 is 14½inches, and the interval between adjacent second spaced stations 34 is 22½ inches, the intervals could be slightly different from these values and the present invention would still function (for example 14 5/32 inches). Therefore, minor variations in the value of the spaced interval are intended to be embraced within the scope of the claimed invention.

FIG. 3 is a reduced fragmented top plan view of a second embodiment of the tape, generally designated as 122. In tape 122, conventional tape measure markings are also disposed on surface 124 of tape 122 for convenience.

FIG. 4 is a reduced fragmented top plan view of a third embodiment of the tape, generally designated as 222. Tape 222 only has first spaced stations 232 disposed on surface 224 of tape 222. These are the only spaced stations disposed on surface 224 of tape 222.

FIG. 5 is a reduced fragmented top plan view of a fourth embodiment of the tape, generally designated as 322. Tape 322 only has second spaced stations 334 disposed on surface 324. These are the only spaced stations disposed on surface 324 of tape 222.

FIG. 6 is a reduced fragmented top plan view of tape 22 placed upon a board 500 (such as an elongated two-by-four). Free end 28 of tape 22 has been placed at end 501 of board 500. Tape 22 has been used to make marks 36 at 14½ inch intervals.

FIG. 7 is a reduced fragmented top plan view of board 500 and marks 36.

FIG. 8 is an enlarged view of area 8 of FIG. 7 showing a saw blade 502 registered against first mark 36. Saw blade 502 has been registered against line 36 so that a cut will subtract width W of blade 502 from first block 40. That is, the right side of blade 502 is aligned with mark 36, so the cut is made toward end 501. This is defined as making a "back cut." In this fashion, first block 40 will be 14½ inches minus width W (about 3/32 inches) inches long. If all subsequent cuts are also "back cut," then all blocks will be the same length (14½ minus W).

A method for fabricating wood blocks includes:

(1) providing a device 20 for measuring wood blocks, including a tape 22 having a surface 24, a first plurality of spaced stations 32 longitudinally disposed on surface 24 of tape 22, the first plurality of spaced stations 32 being 14½ inches apart, and a second plurality of spaced stations 34 longitudinally disposed on surface 24 of tape 22, the second plurality of spaced stations 34 being 22½ inches apart;

(2) providing an elongate board 500;

(3) providing a marking implement;

(4) providing a saw having a blade 502 having a width W;

(5) longitudinally placing tape 24 along board 500;

(6) using the marking implement to make marks 36 on board 500 corresponding to the location of either first plurality of spaced stations 32, or second plurality of spaced stations 34; and, (7) using saw blade 502 to cut board 500 at marks 36, thereby resulting in a plurality of wood blocks which are either (1) 14½ minus W inches long, or (2) 22½ minus W inches long.

The method further includes:

in step (5), placing a free end 28 of tape 22 at an end 501 of board 500;

in step (6), ensuring that a first mark 36 is 14½ inches from end 501;

in step (7), ensuring that saw blade 502 makes a back cut toward end 501 of board 500, thereby ensuring that a first block 40 will be 14½ minus W inches long; and, in step (7), making all subsequent cuts back cuts.

The method further includes:

in step (5), placing a free end 28 of tape 22 at an end 501 of board 500;

in step (6), ensuring that a first mark 36 is 22½ inches from end 501;

in step (7), ensuring that saw blade 502 makes a back cut toward first end 501 of board 500, thereby ensuring that a first block 40 will be 22½ minus W inches long; and, in step (7), making all subsequent cuts back cuts.

The preferred embodiments of the invention described herein are exemplary and numerous modifications, dimensional variations, and rearrangements that can be readily envisioned to achieve an equivalent result, all of which are intended to be embraced within the scope of the appended claims.

I claim:

1. A device for measuring wood blocks, comprising:

a tape having a surface;

a first plurality of spaced stations longitudinally disposed on said surface of said tape, said first plurality of spaced stations being 14½ inches apart;

a second plurality of spaced stations longitudinally disposed on said surface of said tape, said second plurality of spaced stations being 22½ inches apart; and, said first plurality of spaced stations and said second plurality of spaced stations being the only spaced stations disposed on said surface of said tape.

* * * * *